United States Patent
Craswell et al.

(10) Patent No.: US 11,050,740 B2
(45) Date of Patent: Jun. 29, 2021

(54) THIRD PARTY MULTI-FACTOR AUTHENTICATION WITH PUSH NOTIFICATIONS

(71) Applicant: OneLogin, Inc., San Francisco, CA (US)

(72) Inventors: Ronald Craswell, Redmond, WA (US); Peter Ung, Redmond, WA (US)

(73) Assignee: OneLogin, Inc., San Francisco, CA (US)

( * ) Notice: Subject to any disclaimer, the term of this patent is extended or adjusted under 35 U.S.C. 154(b) by 173 days.

(21) Appl. No.: 16/125,731

(22) Filed: Sep. 9, 2018

(65) Prior Publication Data

US 2020/0084204 A1 Mar. 12, 2020

(51) Int. Cl.
*H04L 29/06* (2006.01)
*H04L 29/08* (2006.01)

(52) U.S. Cl.
CPC ...... *H04L 63/0838* (2013.01); *H04L 63/0428* (2013.01); *H04L 67/02* (2013.01); *H04L 2463/082* (2013.01)

(58) Field of Classification Search
CPC ............. H04L 63/0838; H04L 63/0428; H04L 63/0846; H04L 63/0853; H04L 2463/082; H04L 67/02; H04L 63/18; H04L 63/0869; G06F 21/34; H04W 12/04
See application file for complete search history.

(56) References Cited

U.S. PATENT DOCUMENTS

| 7,373,515 | B2 | 5/2008 | Owen |
| 8,090,945 | B2 | 1/2012 | Singhal |
| 8,286,227 | B1 | 10/2012 | Zheng |
| 8,365,258 | B2 | 1/2013 | Dispensa |
| 8,868,923 | B1 | 10/2014 | Hamlet |
| 2014/0157381 | A1 | 6/2014 | Disraeli |
| 2014/0189808 | A1 | 7/2014 | Mahaffey |
| 2014/0250518 | A1 | 9/2014 | Schneider |
| 2016/0197914 | A1 | 7/2016 | Oberheide |
| 2016/0337344 | A1 | 11/2016 | Johansson |
| 2017/0357799 | A1 | 12/2017 | Feher |
| 2018/0176212 | A1 | 6/2018 | Nair |

OTHER PUBLICATIONS

M'Raihi, et al., TOTP: Time-Based One-Time Password Algorithm, Internet Engineering Task Force, ISSN: 2070-1721, May 2011, located at: https://tools.ietf.org/html/rfc6238.
European Search Report dated Nov. 21, 2019, European Patent Application No. 19196278.6.
Response to European Search Report dated Sep. 10, 2020, European Patent Application No. 19196278.6.

*Primary Examiner* — Kevin Bechtel
*Assistant Examiner* — Sangseok Park
(74) *Attorney, Agent, or Firm* — Vierra Magen Marcus LLP

(57) ABSTRACT

Multi-factor authentication is started by a software component on a first computing system identifying request information for an access code to allow access to a network resource. The request information is transmitted from the first computing system to a second computing system. Access to the network resource is confirmed at the second computing system in response to the request information. The access code is automatically provided to the software component on the first computing system in response to the confirming access to the network resource at the second computing system. The software component then provides the access code to allow access to the network resource.

19 Claims, 6 Drawing Sheets

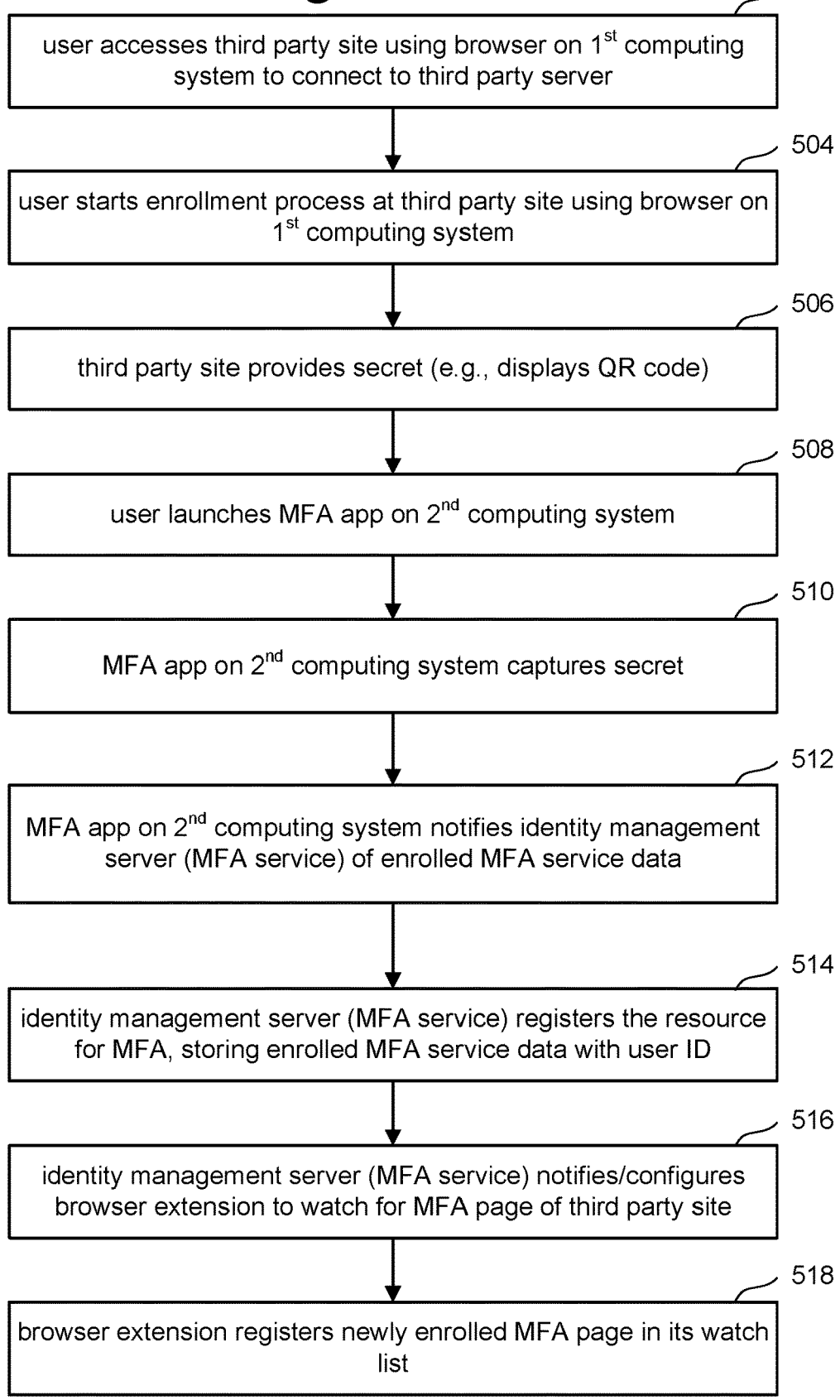

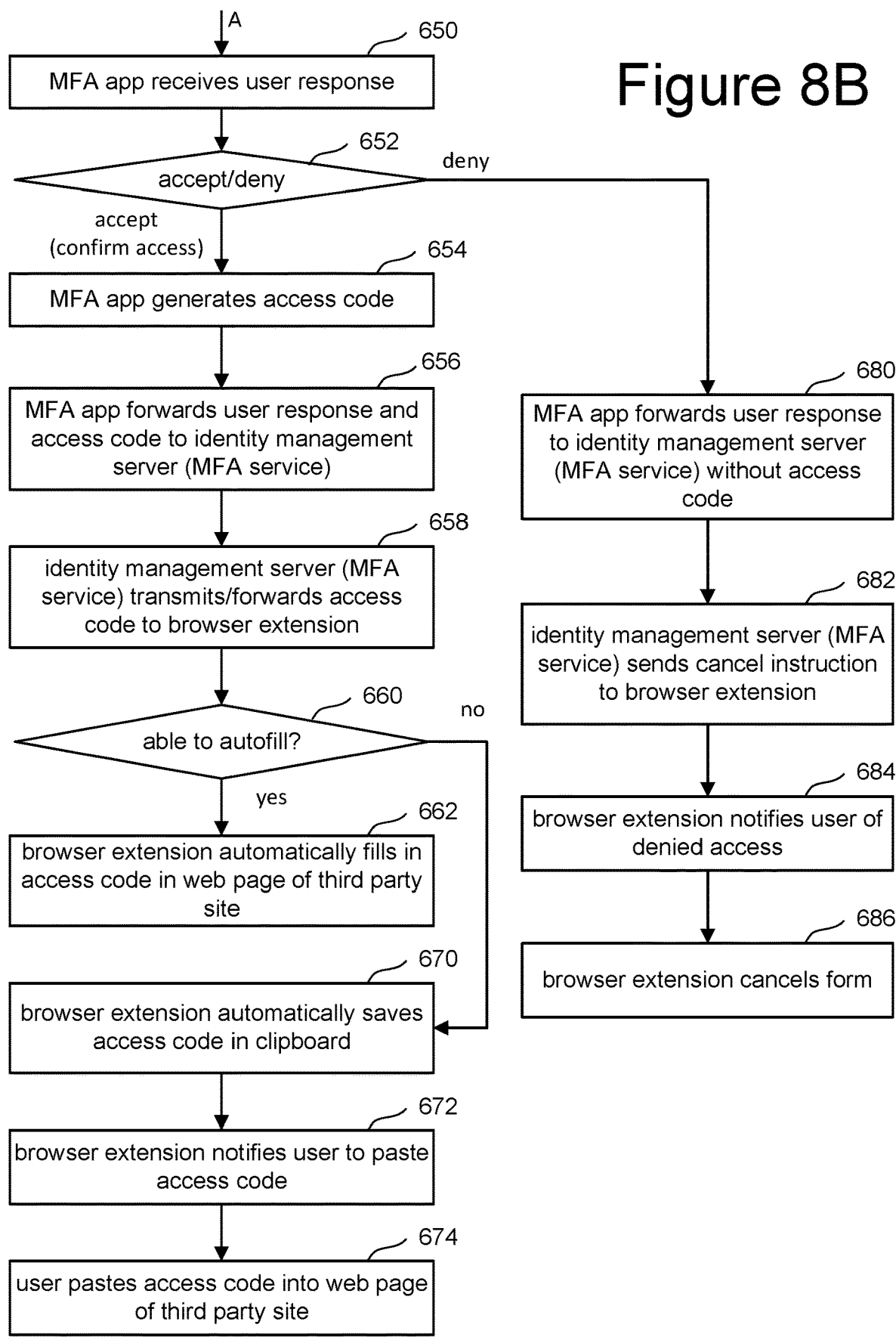

THIRD PARTY MULTI-FACTOR AUTHENTICATION WITH PUSH NOTIFICATIONS

BACKGROUND

A network resource is anything that can be accessed via the network. Examples of network resources include websites accessible via the Internet, software as a service (SAAS), storage and hardware devices that can be communicated with via a network. Often, the network resource needs to be protected by restricting access to authorized users. To determine if a user is authorized, a system often first confirms a user's identity.

Multi-factor authentication (MFA) is a method of confirming a user's claimed identity in which a computer user is granted access only after successfully presenting two or more pieces of evidence (or factors) to an authentication mechanism. Two-factor authentication is a type (subset) of multi-factor authentication. It is a method of confirming users' claimed identities by using a combination of two different factors.

An example of two-factor authentication is the withdrawing of money from an ATM. Only the correct combination of a bank card (something that the user possesses) and a personal identification number (something that the user knows) allows the transaction to be carried out. Typically, two-factor authentication is a method of confirming a user's claimed identity by utilizing something they know (password) and a second factor. An example of a second factor is the user repeating back something that was sent to them through an out-of-band mechanism. Or the second factor might be a six digit number generated by an application that is common to the user and the authentication system.

The Time-based One-Time Password algorithm (TOTP) is an algorithm that computes a one-time password from a secret key and the current time. It has been adopted as Internet Engineering Task Force standard RFC 6238, and is used in a number of two-factor authentication systems. TOTP is an example of a hash-based message authentication code (HMAC). It combines a secret key with the current timestamp using a cryptographic hash function to generate a one-time password. Because network latency and out-of-sync clocks can result in the password recipient having to try a range of possible times to authenticate against, the timestamp typically increases in 30-second intervals, which thus cuts the potential search space.

In a typical two-factor authentication application using TOTP, the user accessing a network resource user enters username and password into a form on a website. An application running on the user's smartphone (also known as a MFA app) uses TOTP to generate an access code (also referred to as a token) and displays that access code to the user in possession of the smartphone. The user then manually types the access code into a form on the website. The server supporting the website also uses TOTP to generate the access code. If the user's username and password match what is stored in the server, and the access code typed in by the user matches the access code generated by the server, then the user has successfully authenticated using MFA The mobile app based MFA currently require users to request access via a login mechanism in an application, open an MFA app on their mobile device, read the 6 to 8 digit number, and then manually that number into the appropriate field in the application login form. This process is slow, cumbersome, and has the potential for error in both the reading and typing components.

BRIEF DESCRIPTION OF THE DRAWINGS

Like-numbered elements refer to common components in the different figures.

FIG. 7 is a flow chart describing one embodiment of a process for registering multi-factor authentication service for a network resource.

FIGS. 8A and 8B together are a flow chart describing one embodiment of a process for accessing a network resource using multi-factor authentication.

DETAILED DESCRIPTION

To speed up the MFA process and reduce errors, it is proposed to push MFA notifications to a second computing system (e.g., a mobile device) and automatically inject an access code resulting from the MFA process directly into the login process without the user being required to type the access code (e.g., the user is not required to type the access code into a form in a browser).

In one example embodiment, MFA process is started by a software component on a first computing system identifying request information for an access code to allow access to a network resource. The first computing system is connected to a network. The request information is transmitted, via a network, from the first computing system to a second computing system (directly or via a server). The second computing system is separate from the first computing system. Access to the network resource is confirmed at the second computing system in response to the request information. The access code is automatically provided to the software component on the first computing system (via the network) in response to the confirming access to the network resource at the second computing system. The software component then provides the access code to allow access to the network resource.

In one embodiment, the software component is a browser extension installed for a browser on the first computing system, the identifying request information comprises the browser extension identifying request information for a MFA request for the access code in the browser, and the providing the access code to allow access to the network resource comprises the browser extension automatically inserting the access code into a form in the browser without requiring the user to manually insert (e.g. typing) the access code into the first computer.

Figure 1:
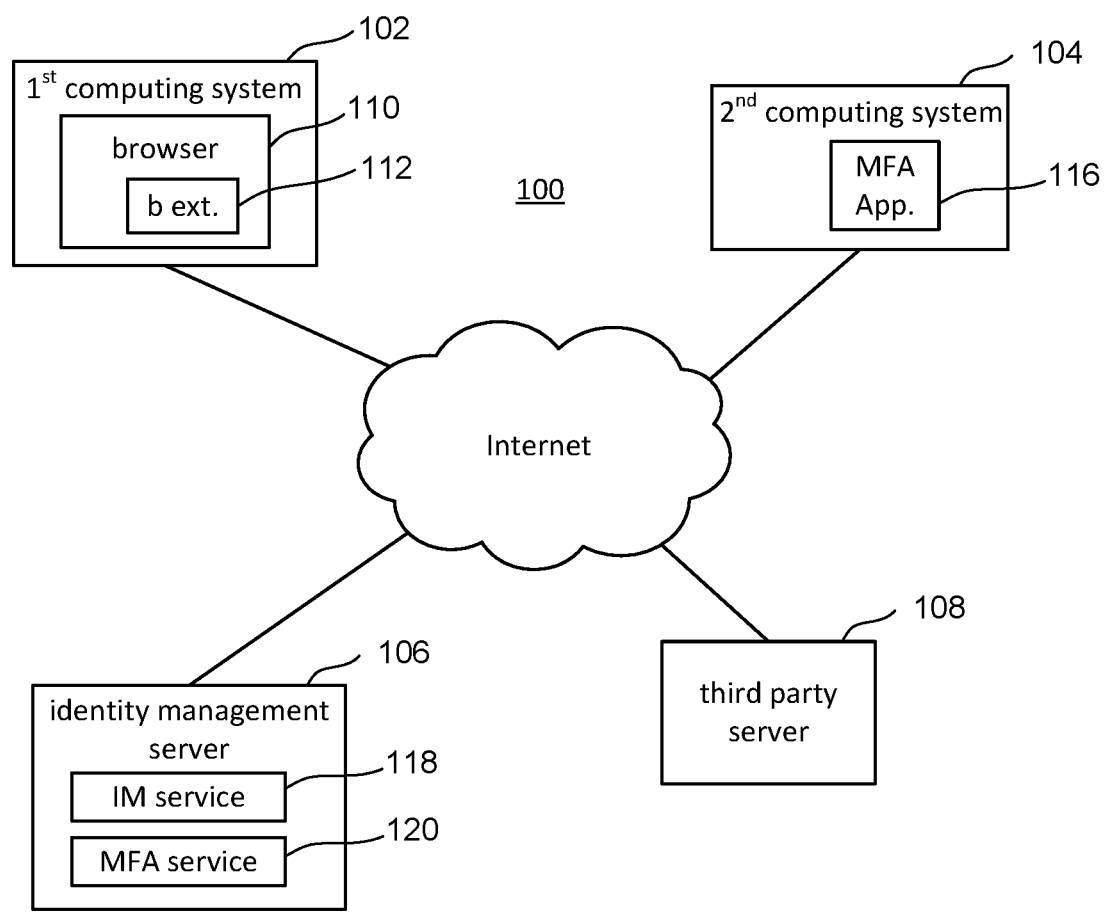
FIG. 1 is a block diagram of a system that uses multi-factor authentication.

FIG. 1 is a block diagram of a system 100 that implements the proposed technology to perform MFA. In one embodiment, system 100 includes a first computing system 102, a second computing system 104, identity management server 106 and third party server 108, all in communication with each other via one or more networks (e.g., including the Internet). Identity management server 106 is separate from first computing system 102 and separate from second computing system 104. First computing system 102 is separate from second computing system 104. For purposes of this document, "separate" means that the two devices are physically different machines.

First computing system 102 can be a desktop computer, laptop computer, smartphone, tablet, smart watch, smart appliance or other type of computer or computing system. First computing system 102 includes a communication interface (e.g., WiFi or wired Ethernet), local memory, solid state drive ("SSD") or hard disk drive, user interface and a processor (one or multi-core), all of which are connected to each other. The processor is configured (e.g., programmed) to perform the processes described below by executing processor readable code stored on a non-transitory processor readable storage medium.

First computing system 102 includes a browser 110, which is a standard web browser known in the art that is used to browse the Internet (or other networks or a computing device). Examples of browsers are Firefox, Safari, Chrome, Internet Explorer and Edge. Other browsers can also be used.

First computing system 102 also includes a browser extension 112. A browser extension is a plug-in that extends the functionality of a browser. Some extensions are authored using web technologies such as HTML, JavaScript, and CSS. Others are developed using machine code and application programming interfaces (APIs) provided by web browsers, such as NPAPI and PPAPI. Browser extensions can change the user interface of the web browser without directly affecting viewable content of a web page; for example, by adding a browser toolbar or buttons. In computing, a plug-in is a software component that adds a specific feature to an existing computer program. When a program supports plug-ins, it enables customization. The common examples are the plug-ins used in browsers to add new features such as search-engines, virus scanners, or the ability to use a new file type such as a new video format. Therefore, browser extension 112 is a software component that adds a specific feature to a browser.

In one embodiment, second computing system 104 is a mobile computing device (e.g., smartphone) that is carried/possessed by the same user who is operating first computing system 102 (e.g., desktop computer). In other embodiment, second computing system 104 can be a desktop computer, laptop computer, tablet, smart watch, smart appliance or other type of computer or computing system. Second computing system 104 includes a communication interface (e.g., WiFi or wired Ethernet), local memory, SSD or hard disk drive, user interface and a processor (one or multi-core), all of which are connected to each other. The processor is configured (e.g., programmed) to perform the processes described below by executing processor readable code stored on a non-transitory processor readable storage medium.

Second computing system 104 includes a software application referred to as a MFA app 116. In one embodiment, MFA app 116 interacts with the user to allow the user to complete the MFA. In one embodiment, MFA app 116 is a software application that can be downloaded from an App Store for a smartphone.

Identity management server 106 comprises one or more servers that include IM service software 118 to provide identity and access management services for network resources protected by identity management server 106. In one example embodiment, the MFA proposed herein is for network resources that do not receive identity and access management services from identity management server 106. Identity management server 106 also includes MFA service software 120 for supporting and performing portions of the MFA process, as described below. Identity management server 106 includes a communication interface (e.g., WiFi or wired Ethernet), local memory, one or many SSDs or hard disk drives, user interface and a processor (one or multi-core), all of which are connected to each other. The processor is configured (e.g., programmed) to perform the processes described below by executing processor readable code stored on a non-transitory processor readable storage medium.

Third party server 108 comprises one or more servers that provide a network resource on a network. For example, in one embodiment third party server 108 comprises an application server and/or web server that provides a website which serves as a portal to a web application (e.g., e-commerce site), SAAS, or data store. The website provided by third party server 108 is referred to as a third party site.

Figure 2:
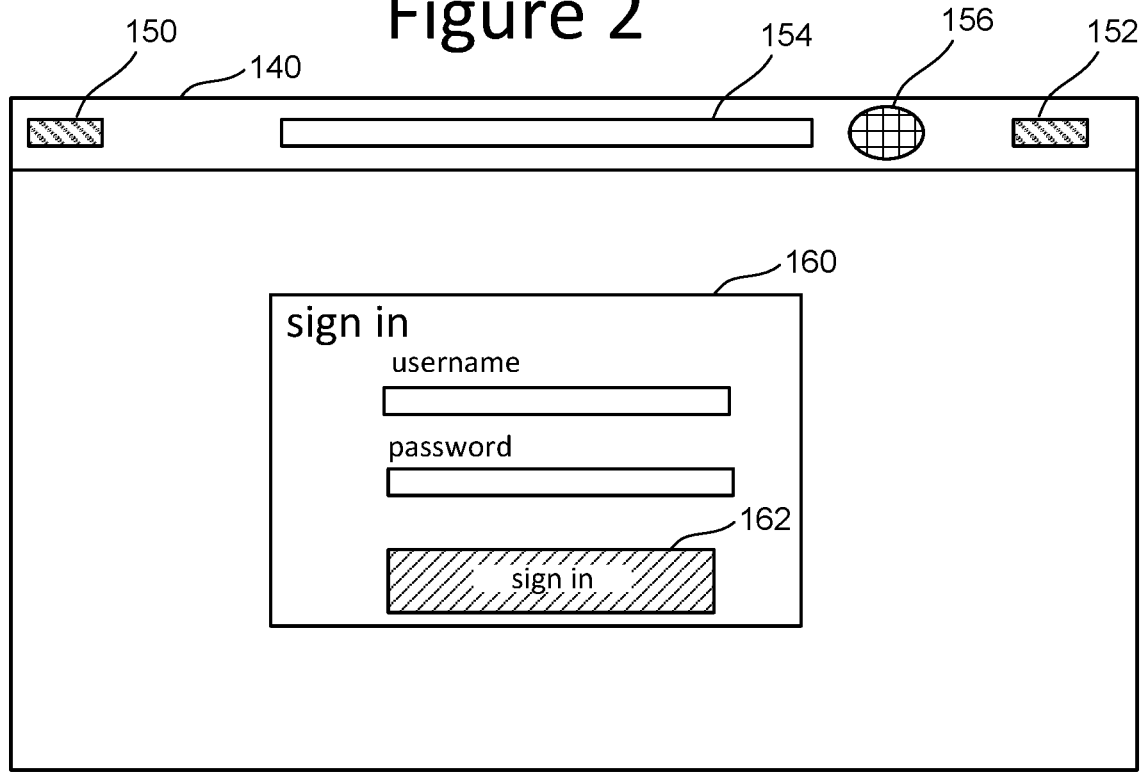
FIG. 2 depicts a browser window.

FIG. 2 depicts a browser window 140 provided by browser 110 on first computing system 102. Browser window 140 includes control items 150 and 152, which can include a forward button, back button, reload button, home button, bookmarks menu, favorites menu, print button, "save as" button, etc. Browser window 140 also includes field 154 for entering a URL or an IP address. Browser window 140 also includes an icon 156, which serves as a graphical indication of browser extension 112. In one embodiment, icon 156 serves as a button so that when the user clicks on icon 156, browser extension 112 is activated to perform a function (as described below).

A user operating first computing system 102 can access a network resource via a web site from third party server 108. To access that network resource, the user must first be authenticated. The web site from third party server 108 provides/displays a page to perform authentication. In FIG. 2, browser window 140 is displaying a "sign in" window 160, which is an example of a page to perform authentication provided by the web site from third party server 108. The "sign in" window 160 includes a field to enter a username, a field to enter a password, and a button 162 (labeled "sign in"). A user can type in the user's username, type in the user's password and then click on button 162 to submit the user's login credentials. If the network resource only requires single factor authentication, then after the user correctly submits the user's username and password, the user can be properly authenticated and provided access to the network resource.

If the network resource requires using multi-factor authentication, then another step is performed for the authentication process. For example, after the user correctly enters the user name and password into the form of window 160, the user will be presented with a two-step verification window 170 of FIG. 3. The user is being asked to enter a six-digit access code that has been sent to the user's other device (e.g. smartphone). Two-step verification window 170 includes field 172 for entering the six-digit access code. In other embodiments, an eight-digit access code or an access code with a different number of digits can also be used. In one embodiment, the access code is sent to a user's cell phone via text message. The user can read the access code and manually type the access code into the form depicted in window 170 (e.g., manually type the access code into field 172). Alternatively, the user may have an application installed on the user's cell phone (or other computing device) that will generate and display the access code. That access code will then be manually typed into field 172 by the user. After typing the code into field 172, the user can click on "sign in" button 174 to complete authentication. If the user does not have an access code, the user can click on the "cancel" button 176 to cancel the authentication process.

Figure 3:
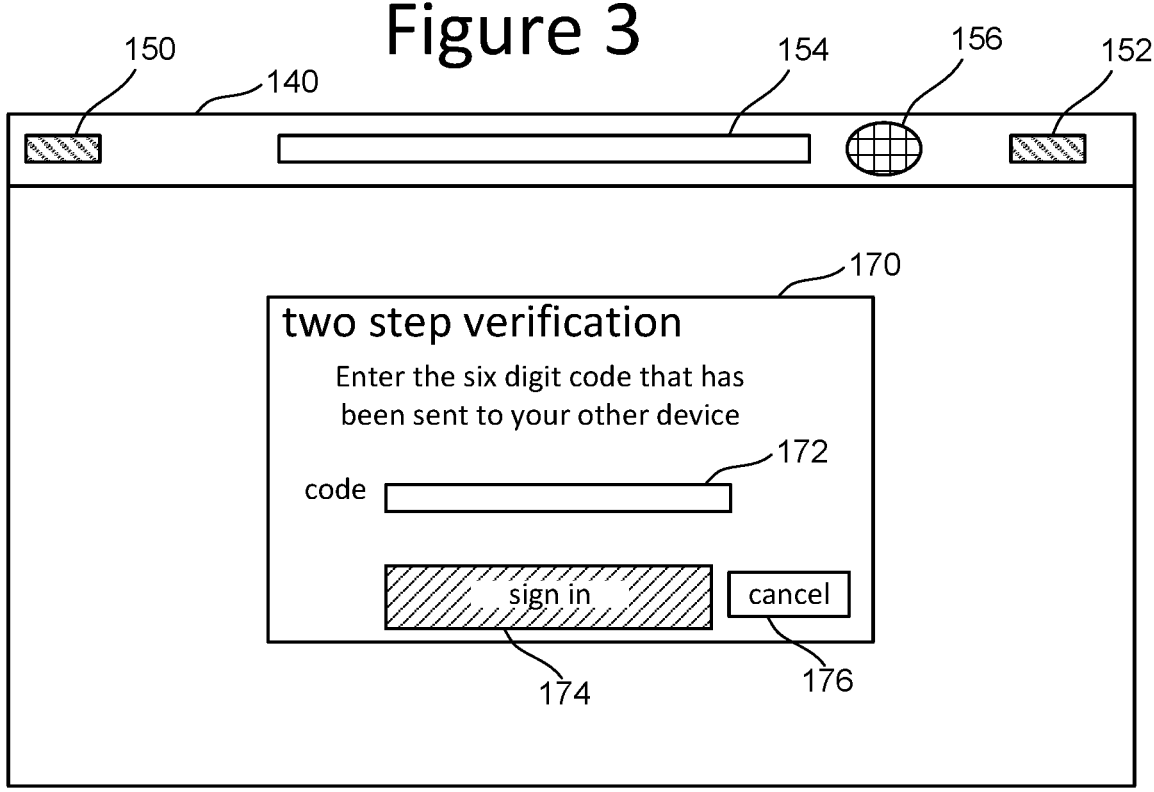
FIG. 3 depicts a browser window.

In the above-examples, the user manually types the access code into field 172 of the form depicted in window 170 of FIG. 3. However, it can be cumbersome to type the code and the user is susceptible to making typographical errors when typing that code. If there is an error when typing the access code, then the authentication will fail. To speed up the multi-factor authentication process and reduce errors, it is proposed to push a notification to second computing system 104 and automatically inject the access code resulting from the push process directly into the form of window 170, without the user being required to manually type the access code into the form. For example, when form 170 is presented, browser extension 112 contacts MFA app 116 running on the user's cell phone. MFA app 116 confirms whether the user wants to allow or deny access to the network resource. If the user allows access to the network resource, then MFA app 116 on the user' cell phone (or other computing device) automatically generates the access code and provides (directly or indirectly) the access code to browser extension 112, which injects the access code into field 172.

Figure 4:
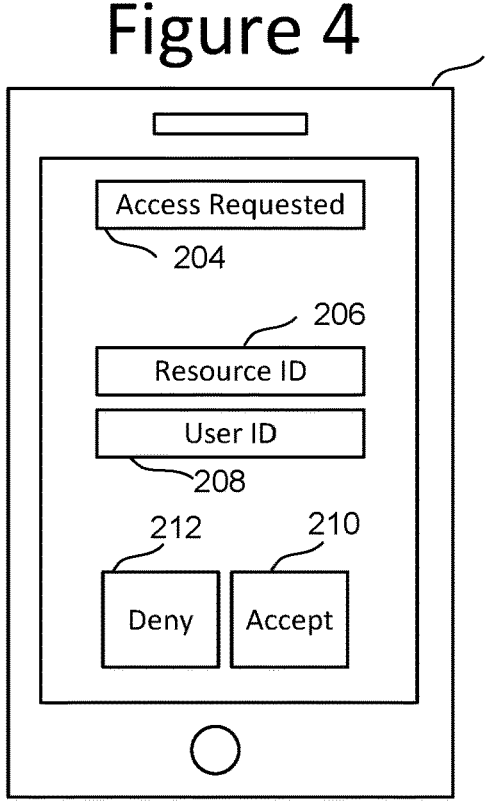
FIG. 4 depicts a smartphone.
Figure 6:
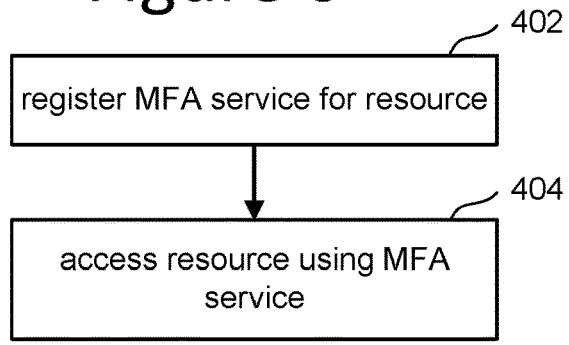
FIG. 6 is a flow chart describing one embodiment of a process for implementing multi-factor authentication.

FIG. 4 depicts cell phone 202 running MFA app 116. Cell phone 202 is one example embodiment of second computing device 104. In other embodiments, other types of devices can be used to implement second computing device 104. FIG. 4 shows MFA app 116 providing a graphical user interface to confirm whether the user wants to access a network resource as part of a multi-factor authentication. For example, in response to the two-step verification window 170 of FIG. 3, browser extension 112 automatically contacts (directly or indirectly) MFA app 116 on cell phone 202 by pushing a MFA notification to cell phone 202. In response to the MFA notification from browser extension 112, MFA app 116 on cell phone 202 requests the user to confirm or deny access to the network resource. For example, FIG. 4 shows cell phone 202 depicting notification 204 that access to a network resource is requested. MFA app 116 on cell phone 202 also displays an identification 206 of the network resource and an identification 208 of the user. The user will have the opportunity to allow access to the network resource by pushing the Accept button 210 or deny access to the network resource by pushing the Deny button 212. In response to the user pushing the Accept button 210, MFA app 116 on cell phone 202 generates the access code and contacts browser extension 112 (directly or via an identity management server 106) to automatically insert the access code into field 172 and select the "sign-in" button 174 of window 170 depicted in FIG. 3. In response to the user pushing the Deny button 212, MFA app 116 on cell phone 202 contacts browser extension 112 (directly or via an identity management server 106) to select the "cancel" button 176 of window 170 depicted in FIG. 3.

Figure 5:
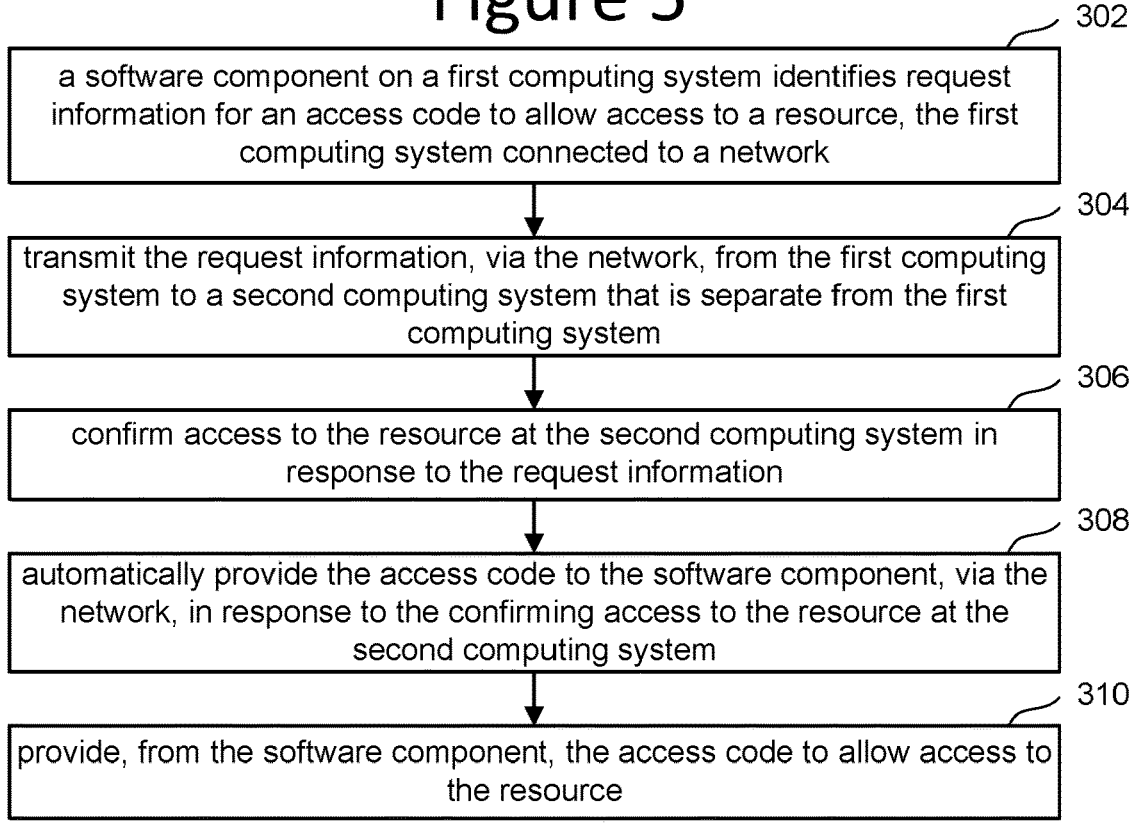
FIG. 5 is a flow chart describing one embodiment of a process for implementing multi-factor authentication.

FIG. 5 is flowchart describing one embodiment of a process for implementing multi-factor authentication. The process of FIG. 5 is an example of operating the components of FIGS. 1-4. In step 302, a software component of first computing system 102 identifies request information for an access code to allow access to a network resource. The first computing system is connected to a network. One example of a software component in step 302 is browser extension 112; however, other software can also be used. It is not necessary that a browser extension is used. For example, the software component can be a program running on first computing system 102. The access code can be a six or eight-digit code (or other amount of digits) used to provide multi-factor authentication, as described herein. The request information includes particulars of what is requested (e.g. URL, account, username, issuer, and/or other related information). In one example embodiment, the software component is monitoring a browser or other software on first computing system 102, identifies a request for an access code and identifies information (the request information) associated with that request for the access code (e.g. URL, account, username, issuer, and/or other related information).

In step 304, the software component transmits the request information from step 302, via the network, from the first computing system 102 to the second computing system 104. As discussed above, the second computing system is separate from the first computing system. Step 304 recites that the requested information is transmitted "via the network" rather than manually inputted by a user. In step 306, access to the network resource is confirmed at the second computing system 104, in response to the request information. For example, the user is presented with the user interface depicted in FIG. 4 and the user can confirm access to the network resource by clicking on the Accept button 210. In step 308, the access code is automatically provided to the software component, via the network, in response to the confirming of the access to the network resource at the second computing system 104. In one embodiment, the second computing system 104 generates the access code and transmits it directly to browser extension 112. In another embodiment, second computing system 104 generates the access code and sends it to browser extension 112 via identity management server 106. In another embodiment, identity management server 106 generates the access code and transmits it to browser extension 112 (or other software). In step 310, the access code is provided from the software component in order to allow access to the network resource. For example, the software component (e.g. browser extension 112) can automatically insert the code into field 172 of the form depicted in FIG. 3. In another embodiment, the access code can be saved on the clipboard for first computing system 102 so that the user can paste the access into field 172 of FIG. 3. In either case, the user is not required to type the access code into the form.

FIGS. 6, 7, 8A and 8B depict flowcharts describing more details of one example implementation of the process of FIG. 5. In step 402 of FIG. 6, a user and/or a computer registers MFA service for a particular network resource. For example, a user can navigate to a settings page for an e-commerce website or portal for a SAAS, and register for multi-factor authentication for that website/SAAS. Users may choose to use MFA in order to have a greater level of security for the user's account(s). For example, if the network resource includes online banking or sensitive business information, the user is highly motivated to maintain the highest levels of security. In step 404, after registering, the user accesses the network resource using the MFA service.

FIG. 7 is a flowchart describing one embodiment of a process for registering MFA service for a network resource. The process of FIG. 7 is an example implementation of step 402 of FIG. 6. In step 502 of FIG. 7, a user accesses a third-party site using a browser 110 on first computing system 102 to connect to third-party server 108. Third-party server 108 serves the website (network resource) the user is seeking to access. In step 504, using browser 110 on first computing system 102, the user accesses a page on the website of third-party server 108 that allows the user to enroll in (or start) the MFA service. The user starts the enrollment process at the third-party site by entering the information requested by the third party site and/or simply choosing a button (or other interface item) that indicates the user's desire to implement MFA.

In step 506, the third party site on third party server 108 provides a secret key. In one example, the third party site displays a QR code. Secret keys may be encoded in QR codes as a URI with the following format:
otpauth://TYPE/LABEL?PARAMETERS Valid values for TYPE are hotp and totp, to distinguish whether the key will be used for counter-based HOTP or for TOTP.

The LABEL is used to identify which account a key is associated with. It is in the form of <account>:<username>. <username> is a URI-encoded string that identifies the user, such as an email address or other username. <account> is a string identifying a provider or service managing that <username>. This <account> prefix can be used to prevent collisions between different usernames with different providers that might be identified using the same username, e.g. the user's email address.

Examples of PARAMETERS include: secret key, issuer, algorithm, digits, counter, and period.

The secret key parameter is an arbitrary key value encoded in Base32 according to RFC 3548. The padding specified in RFC 3548 section 2.2 is not required.

The issuer parameter is a string value indicating the provider or service this account is associated with. If the issuer parameter is absent, issuer information may be taken from the <account> prefix of the label.

The algorithm parameter indicates the cryptographic hash method (e.g., SHA1, SHA256, SHA512) used to generate the access code (token).

The digits parameter may have the values 6 or 8, and determines how long of a one-time access code to provide to the user. In one embodiment, the default is 6.

If TYPE is hotp, then the counter parameter is required when provisioning a key for use with HOTP. It will set the initial counter value.

If TYPE is totp, then the period parameter defines a period that a TOTP code will be valid for, in seconds. In one embodiment, the default value is 30 second.

In step 508, the use launches the MFA App 116 on second computing system 104. In step 510, the MFA app 116 on second computing system 104 captures the shared secret. For example, second computing system 104 is held up so that the camera for second computing system 104 views the QR code and the MFA app 116 reads the QR code. In step 512, MFA app on second computing system 104 notifies identity management server 106 (MFA service 120) of the enrolled MFA service data by sending a message that includes the <account>, <username>, secret key and issuer parameter to identity management server 106 (MFA service 120).

In step 514, identity management server 106 (MFA service 120) registers the network resource for MFA. This includes storing the enrolled MFA service data with a user ID. It is contemplated that identity management server 106 include identity management records for each of its users. Those identity management records include a user ID. The MFA service data in step 514 is stored with that identity management record associated with the user ID. In step 516, identity management server 106 (MFA service 120) notifies/configures browser extension 112 to watch for the MFA page of the third-party site from third-party server 108. For example, identity management server 106 may send the URL for the page depicted in FIG. 3 to browser extension 112 so that browser extension 112 will monitor and look out for that page being served to the user in browser 110. In step 518, browser extension 112 registers the newly enrolled MFA page in its watch list. For example, in one implementation, browser extension 112 includes a list of URLs it is monitoring. Thus, the new URL received in step 516 is added to that list in step 518. In another embodiment, browser extension 112 stores information other than the URL in order to identify the MFA request page. For example, browser extension 112 can store information identifying the network resource and have logic that recognizes the form for entering an access code for MFA.

Figure 8A:
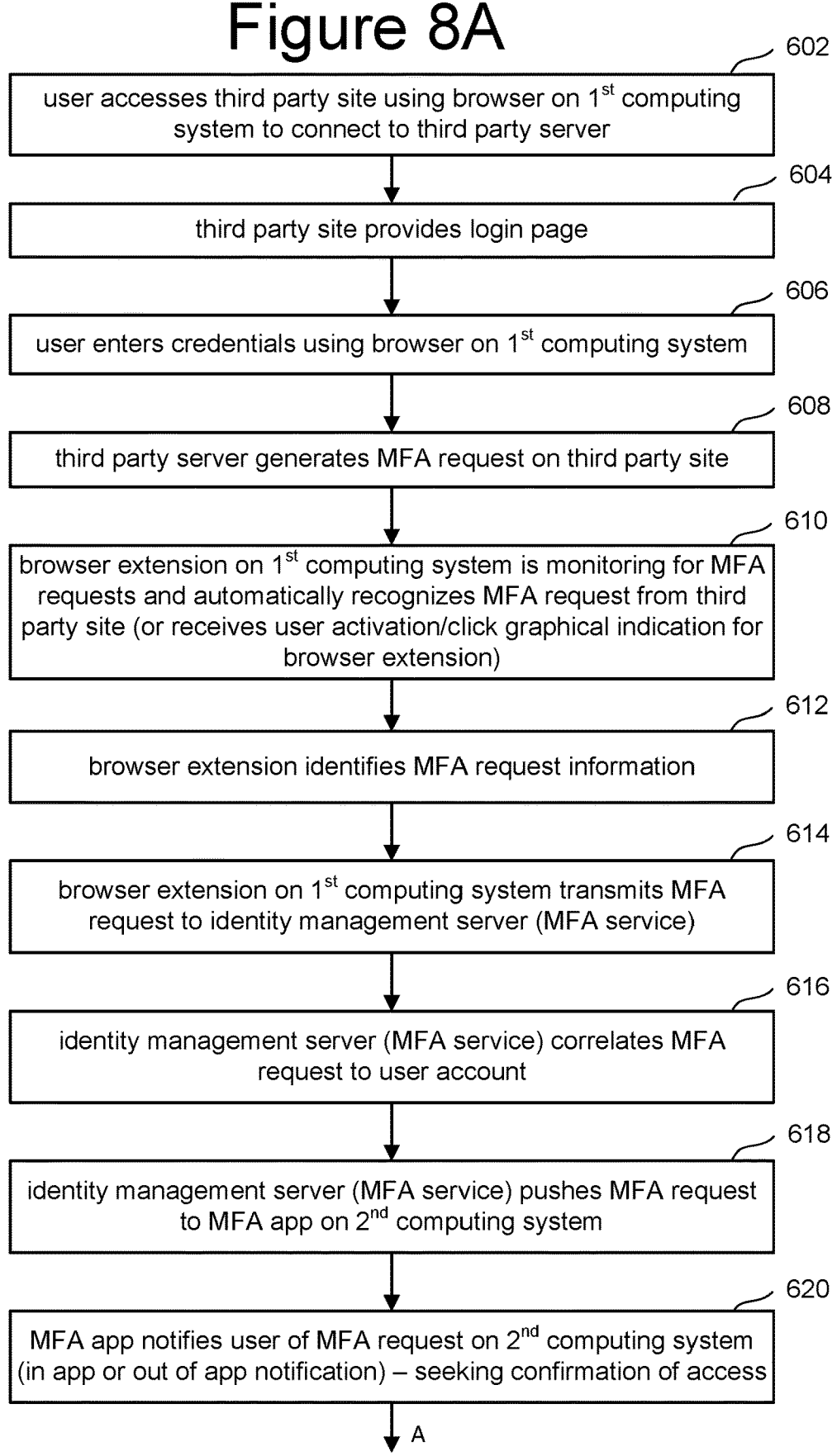

Once the user has registered for the MFA service using the process of FIG. 7, then the user can access the network resource using MFA. FIGS. 8A and 8B together are a flowchart describing one embodiment of a process for accessing a network resource using the MFA service. The process depicted in FIG. 8A combined with FIG. 8B is one example implementation of step 404 of FIG. 6. In step 602 of FIG. 8A, the user attempts to accesses a network resource via a third party web site implemented by third party server 108. The user is operating browser 110 on first computing system 102 to connect to third party server 108 for accessing the network resource. For example, the user may navigate browser 110 to a website acting as a portal for SAAS or an e-commerce website. In step 604, the third party web site provides a login page, such as depicted in FIG. 2. In step 606, the user enters the user's credentials (e.g., username and password) using browser 110 on first computing system 102. In step 608, third party server 108 generates an MFA request on the third party web site. For example, third party server 108 will serve/display window 170 of FIG. 3 requesting an access code. The MFA request of step 608 is a request to perform multi-factor authentication.

In one embodiment, browser extension 112 is automatically monitoring browser 110 for MFA requests. In step 610, browser extension 112 automatically recognizes the MFA request from the third party web site while monitoring for MFA requests. For example, browser extension 112 automatically recognizes the form of window 170 of FIG. 3. In an alternative embodiment, instead of browser extension 112 automatically recognizing the MFA request (e.g. automatically recognizing the form requesting an access code), the user activates browser extension 112 by clicking on icon 156 (FIG. 3) to perform MFA. In step 612, browser extension 112 identifies the MFA request information. In one embodiment, the MFA request information includes information that identifies what the MFA is for. In one embodiment, the MFA request information includes the URL of the third party web site, the URL for the MFA request window 170, identification of the user, identification of the network resource, identification of the organization that the user is part of and/or other information. A subset of that information can also be used. In step 614, browser extension 112 on first computing system 102 transmits the MFA request information to identity management server 106 (MFA service 120) via the network (e.g. the Internet and one or more local area networks). In step 616, identity management server 106 (MFA service 120) correlates the MFA request to a user account. That is, the MFA request information includes an identification of the user. In one example, the username provided to the form of window 160 of FIG. 2 can be the identification of the user. In another embodiment, browser extension is aware of the user ID used by identity management server 106 for the user. The user identification provided to identity management server 106 from browser extension 112 is used to find the user's identity management record stored by and managed by identity management server 106. The MFA request is correlated to that user identity management record, which includes an indication of the registration of the MFA service (see FIG. 7). Thus, identity management server 106 knows from that information to contact the appropriate second computing system 104. In step 618, identity management server 106 (MFA service 120) pushes an MFA request to the MFA app 116 on second computing system 104.

In step 620, the MFA app 116 notifies the user of MFA request on second computing system 104. For example, the graphical interface depicted in FIG. 4 can be implemented/displayed in step 620. The purpose of the notification is to seek confirmation of whether the user wants to accept access or deny access to the network resource. The notification can be provided from within MFA app 116 or outside of MFA app 116. For example, MFA app 116 may be opened and provide the graphical user interface of FIG. 4. In another embodiment, some operating systems allow MFA app 116 to pop open a window or notification even if MFA app 116 is not active on the screen.

The process of FIG. 8A continues at the top of FIG. 8B (see A). In step 650 of FIG. 8B, MFA app 116 receives the user response. For example, the user may click on the Accept button 210 or the Deny button 212 (see FIG. 4). If the user chooses to accept or confirm access to the network resource (step 652), then the MFA App 116 generates the access code in step 654. In step 656, MFA app 116 forwards the user response and the generated access code to identity management server 106 (MFA service 120). In another embodiment, MFA app 116 only forwards the user response, and identity management server 106 (MFA service 120) generates the access code. The user response forwarded in step 656 includes an indication of whether the user clicked the Accept button 210 or the Deny button 212. In step 658, identity management server 106 (MFA service 120) transmits/forwards the access code to browser extension 112 via the network. In one embodiment, identity management server 106 sends the following information to browser extension 112: web page URL, identification for the form being filled out, an indication of whether the Accept or Deny buttons were selected, and the access code (only if the Accept button 210 was selected). This information is received by browser extension 112. If (step 660) browser extension 112 is able to automatically fill in the form provided by first computing device 102 (e.g. form of window 170), then in step 662 browser extension 112 automatically fills in the access code into the form in the browser for the webpage of the third party site so that the user is not required to manually type the access code into the form. Browser extension 112 also activates "sign in" button 174 (see FIG. 3).

If browser extension 112 is unable to automatically fill in the form (step 660), then browser extension 112 automatically saves the access code into the clipboard for first computing system 102 in step 670 so that the user is not required to manually type the access code into the form. In step 672, browser extension 112 notifies the user to paste the access code into the form. In step 674, the user pastes the access code into the form of the webpage of the third party site.

If the user operating MFA app 116 chooses to select the Deny button 212 (see step 642), then in step 680 MFA app 116 forwards the user response to identity management server 106 (MFA service 120) without an access code. That user response will indicate that the user clicked on Deny button 212. In various embodiments, MFA app 116 can forward any of the following information to the identity management server: web page URL, identification for the form being filled out, indication that the Deny button was selected. In step 682, identity management server 106 (MFA service 120) sends a cancel instruction to browser extension 112 (via the network). In step 684, browser extension 112 notifies the user of the denied access by displaying a window within the browser 110. In step 868, browser extension 112 cancels the form by activating cancel button 176 or another equivalent operation.

The above-described system pushes MFA notifications to a second computing system (e.g., a mobile device) and automatically injects an access code resulting from the MFA process directly into the login process without the user being required to type the access code (e.g., the user is not required to type the access code into a form in a browser). This technology speeds up the MFA process and reduces errors; thereby, resulting in more efficient starting of operation of the software systems (e.g., SAAS, web sites, etc.) and hardware systems (servers providing the SAAS, websites, etc.). As such, the above-described technology results in an improvement in the functioning of the computing systems.

One embodiment includes method for providing authentication, comprising a software component on a first computing system identifying request information for an access code to allow access to a network resource, the first computing system connected to a network; transmitting the request information, via the network, from the first computing system to a second computing system that is separate from the first computing system; confirming access to the network resource at the second computing system in response to the request information; automatically providing the access code to the software component, via the network, in response to the confirming access to the network resource at the second computing system; and providing, from the software component, the access code to allow access to the network resource.

One embodiment includes method for providing authentication, comprising a browser extension installed for a browser on a first computing system identifying MFA request information for a MFA request for an access code in the browser to access a network resource, the first computing system connected to a network; transmitting the MFA request information, via the network, to a remote computing system to obtain confirmation of access to the network resource; receiving the access code at the browser extension via the network in response to the transmitting of the MFA request information; and providing the access code from the browser extension for the MFA request in the browser.

In one example implementation, the browser extension automatically monitors content in the browser and automatically recognizes the MFA request while monitoring. In one example implementation, the providing the MFA code from the browser extension comprises automatically inserting the access code into a form in the browser so that a user is not required to type the access code into the form. In one example implementation, the providing the MFA code from the browser extension comprises storing the access code in a clipboard for the first computing system so that a user is not required to type the access code.

One embodiment includes a non-transitory processor readable storage medium, comprising processor readable code that programs one or more processors to implement a browser extension that performs a method. The method comprises identifying MFA request information for a MFA request for an access code in a browser running on a first computing system connected to a network; transmitting the MFA request information, via the network, to a remote computing system to obtain confirmation of access to a network resource associated with the access code; receiving the access code at the browser extension via the network in response to the transmitting of the MFA request information; and providing the MFA code from the browser extension for the MFA request in the browser. In one example embodiment, the non-transitory processor readable storage medium is a RAM, ROM, hard disk drive, SSD, flash memory MRAM, non-volatile memory, CD-ROM or other storage unit. In one example embodiment, the processor readable code is software such as source code, object code, machine level instructions or other types of software. No particular software language or syntax is required. In one example embodiment, the one or more processors that are programmed are part of a computing system, such as a laptop computer, desktop computer, smartphone, tablet or other device.

One embodiment includes an apparatus for providing authentication, comprising a communication interface, a memory and a processor connected to the communication interface and the memory. The processor is configured (e.g., programmed) to receive request information pertaining to a request for an access code to allow access to a network resource (e.g., step 612). The request information is received from a browser extension installed for a browser on a first computing system remote from the processor. The processor is also configured (e.g., programmed) to transmit the request information to a second computing device remote from the processor that is registered for browser extension (e.g., step 616), receive confirmation of access to the network resource from the second computing device in response to the request information transmitted to the second computing device (e.g., step 656), and transmit the access code to the first computing system in response to receiving the confirmation of access to the network resource from the second computing device (e.g., step 658). In one example embodiment, the apparatus is identity management server 106 running MFA service 120.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method for providing multi-factor authentication ("MFA") for a first computing system to access a first network resource, comprising:
    a third party server providing a secret key to perform MFA, the third party server manages access to the network resource;
    a second computing system receiving the secret key and a user identification;
    the second computing system notifying an identity management server of enrolled MFA service data that indicates MFA for a user identification and the first network resource, the identity management server is separate from the first computing system and the second computing system, the identity management server provides identity and access management services for a second network resource including storing identity management records, the identity management records include an identity management record for the user identification, the identity management server does not provide identity and access management services for the first network resource;
    the identity management server registers the first network resource for MFA with the user identification, including storing at least a subset of the enrolled MFA service data with the identity management record for the user identification, the enrolled MFA service data includes an indication of the first network resource;
    after the second computing system notifying the identity management server of enrolled MFA service data that indicates MFA for the user identification and the first network resource and after the identity management server registers the first network resource for MFA with the user identification, a software component on the first computing system identifying a particular MFA request including particular request information for an access code to allow access to the first network resource, the first computing system is connected to a network;
    transmitting the particular request information, via the network, from the first computing system to the second computing system, the second computing system is separate from the first computing system and the third party server;
    confirming permission to access to the first network resource at the second computing system in response to the particular request information;
    automatically providing the access code to the software component, via the network, in response to the confirming access to the first network resource at the second computing system; and
    providing, from the software component, the access code to allow access to the first network resource in response to the particular MFA request.

2. The method of claim 1, wherein:
    the software component is a browser extension installed for a browser on the first computing system.

3. The method of claim 2, wherein:
    the providing the access code to allow access to the first network resource comprises the browser extension automatically inserting the access code into a form in the browser.

4. The method of claim 2, wherein:
the providing the access code to allow access to the first network resource comprises the browser extension automatically inserting the access code into a clipboard for the first computing system such the access code can be pasted into the browser and a user is not required to type the access code into the browser.

5. The method of claim 2, further comprising:
receiving an input to perform MFA at a graphical indication of the browser extension, the browser extension identifies the particular request information in response to the input to perform MFA.

6. The method of claim 2, further comprising:
the browser extension automatically monitors the browser to automatically detect the particular MFA request in the browser.

7. The method of claim 1, wherein:
the providing the access code to allow access to the first network resource comprises the software component automatically inserting the access code into a form on the first computing system without requiring manual inserting of the access code into the first computing system.

8. The method of claim 1, wherein the transmitting the particular request information from the first computing system to the second computing system comprises:
transmitting the particular request information from the first computing system to the identity management server;
the identity management server correlating the particular request information to the second computing system using the identity management record for the user identification; and
the identity management server forwarding the particular request information from the identity management server to the second computing system.

9. The method of claim 8, further comprising:
generating the access code at the second computing system;
transmitting the access code to the identity management server; and
forwarding the access code from the identity management server to the first computing system.

10. The method of claim 1, wherein:
the enrolled MFA service data includes username and the secret key.

11. The method of claim 1, wherein:
the information identifying the network resource includes a URL.

12. A method for providing multi-factor authentication ("MFA"), comprising:
a browser extension installed for a browser on a first computing system that is remote from an identity management server being configured by the identity management server to watch for MFA requests for access to a first network resource by a specific user, the being configured includes the identity management server providing information identifying the first network resource to the browser extension, the identity management server is separate from the first computing system;
the identity management server providing identity and access management services for a second network resource including storing identity management records, the identity management server does not provide identity and access management services for the first network resource;
the browser extension identifying a specific MFA request including specific MFA request information for an access code in the browser for the specific user to access the first network resource for a specific instance;
transmitting the specific MFA request information to a remote computing system via the identity management server to obtain permission to for the specific user to access the first network resource for the specific instance, the remote computing system is separate from the identity management server and the first computing system;
receiving the access code at the browser extension in response to the transmitting of the specific MFA request information; and
providing the access code from the browser extension for the specific MFA request in the browser;
the browser extension being configured by the identity management server to watch for requests for access to the first network resource by the specific user is performed prior to the browser extension identifying the specific MFA request, the transmitting the specific MFA request information to the remote computing system, the receiving the access code at the browser extension and the providing the access code from the browser extension.

13. The method of claim 12, further comprising:
the browser extension automatically monitoring content in the browser and automatically recognizing the MFA request while monitoring.

14. The method of claim 12, wherein the providing the MFA code from the browser extension comprises:
automatically inserting the access code into a form in the browser so that the specific user is not required to type the access code into the form.

15. An apparatus for facilitating authentication, comprising:
a communication interface;
a memory; and
a processor connected to the communication interface and the memory, the processor implements identity management services and access management services including storing identity management records, the identity management records include an identity management record for a user identification, the processor does not provides identity management services and access management services for a first network resource, the processor provides identity management services and access management services for a second network resource including storing identity management records, the processor is configured to:
configure a browser extension installed for a browser on a first computing system remote from the processor to watch for a multi-factor authentication ("MFA") request for the first network resource, the configuring includes providing information identifying the first network resource to the browser extension,
receive request information pertaining to a MFA request for an access code to allow access to the first network resource, the request information is received from the browser extension,
transmit the request information to a second computing device remote from the processor,
receive permission to access to the first network resource from the second computing device in response to the request information transmitted to the second computing device, and transmit the access code to the first computing system in response to receiving the confirmation of access to the first network resource from the second computing device, the configuring the browser extension is performed prior to receiving the request information pertaining to the MFA request, transmitting the request information to the second computing device, receiving permission to access to the first network resource and transmitting the access code to the first computing system.

16. The apparatus of claim 15, wherein:
the processor is configured to receive a message from the second computing device that the first network resource is registered for MFA with the second computing device.

17. The apparatus of claim 15, wherein:
the processor is configured to receive the access code from the second computing device in coordination with the permission to access the first network resource.

18. The apparatus of claim 15, wherein:
the processor is configured to receive URLs from the first computing device and determine whether the URLs are for requests for access codes to allow access to the first network resource.

19. A non-transitory processor readable storage medium, comprising processor readable code that programs one or more processors to perform a method comprising:
an identity management system configuring a browser extension installed for a browser on a first computing system remote from the identity management system to respond to multi-factor authentication ("MFA") request for a first network resource for a user identification, the identity management system provides identity and access management services including storing identity management records, the identity management records include an identity management record for the user identification, the identity management system provides identity and access management services for a second network resource, the identity management system does not provide identity and access management services for the first network resource;

the identity management system receiving from the browser extension request information pertaining to a particular MFA request for an access code to allow access to the first network resource for the user identification;

the identity management system transmitting the request information to a second computing device, the second computing device is separate from the first computing system and the identity management system;

the identity management system receiving permission for access to the first network resource from the second computing device in response to the request information transmitted to the second computing device, the permission is for the user identification, and the identity management system transmitting the access code to the first computing system in response to the permission for access to the first network resource;

the identity management system performs the configuring of the browser extension prior to the identity management system receiving from the browser extension the request information pertaining to the particular MFA request for the access code, the identity management system transmitting the request information to the second computing device, the identity management system receiving permission for access to the first network resource from the second computing device and the identity management system transmitting the access code to the first computing system.

* * * * *